United States Patent
Kim

(10) Patent No.: US 9,174,533 B2
(45) Date of Patent: Nov. 3, 2015

(54) DRIVE STRUCTURE FOR ELECTRIC BICYCLE

(71) Applicant: MANDO CORPORATION, Pyeongtaek-Si (KR)

(72) Inventor: Il Yong Kim, Gyeonggi-do (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 84 days.

(21) Appl. No.: 13/682,579

(22) Filed: Nov. 20, 2012

(65) Prior Publication Data

US 2014/0080652 A1    Mar. 20, 2014

(30) Foreign Application Priority Data

Sep. 19, 2012 (KR) .................. 10-2012-0104244

(51) Int. Cl.
*B60K 1/00* (2006.01)
*B60K 17/04* (2006.01)
*B62M 6/65* (2010.01)

(52) U.S. Cl.
CPC . *B60K 17/04* (2013.01); *B60K 1/00* (2013.01); *B62M 6/65* (2013.01)

(58) Field of Classification Search
CPC ............ B60K 1/00; B60K 17/04; B62M 6/65
See application file for complete search history.

(56) References Cited

U.S. PATENT DOCUMENTS 6,533,693 B2 *  3/2003  Bowen et al. ................. 475/5
8,100,208 B2 *  1/2012  Jordan ..................... 180/65.51

FOREIGN PATENT DOCUMENTS

| | | |
|---|---|---|
| CN | 1245128 A | 2/2000 |
| CN | 200953505 Y | 9/2007 |
| CN | 101370706 A | 2/2009 |
| DE | 19629788 A1 | 1/1998 |
| EP | 0980821 A2 | 2/2000 |
| EP | 1719656 A1 | 11/2006 |
| KR | 10-2011-0039824 | 4/2011 |
| WO | 2007083995 A1 | 7/2007 |

OTHER PUBLICATIONS

Extended European Search Report issued in Application No. 12190232.4 mailed Dec. 20, 2013.
Chinese Office Action issued in corresponding Chinese Patent Application No. 20121054878.6, mailed on Jun. 19, 2015; 11 pages with Korean language translation.

* cited by examiner

*Primary Examiner* — Edwin A Young
(74) *Attorney, Agent, or Firm* — McDermott Will & Emery LLP

(57) ABSTRACT

A motor structure for an electric bicycle including a motor provided with a rotor and a stator to generate a rotary force to drive a wheel of the electric bicycle, the rotor having an accommodation space formed at a center thereof, a first decelerator unit disposed in the accommodation space and connected to a rotating shaft that is rotated together with the rotor, a second decelerator unit connected to the first decelerator unit and disposed outside the motor, and a motor housing to accommodate the motor and the second decelerator unit.

10 Claims, 5 Drawing Sheets

DRIVE STRUCTURE FOR ELECTRIC BICYCLE

CROSS-REFERENCE TO RELATED APPLICATION

This application claims the benefit of Korean Patent Application No. 2012-0104244, filed on Sep. 19, 2012 in the Korean Intellectual Property Office, the disclosure of which is incorporated herein by reference.

BACKGROUND

1. Field

Embodiments of the present disclosure relate to a motor structure for an electric bicycle, and more particularly, to a motor structure for an electric bicycle having a reduced volume thereof.

2. Description of the Related Art

In general, a bicycle is a means of transportation for a short distance, and widely used for enhancement of heath or as a hobby.

In recent years, an electric bicycle having a motor has been developed to be driven by a driving force of the motor so as to travel in long distance, or reduce physical exhaustion.

A motor structure installed on the electric bicycle to provide a driving force is used while being installed on a front wheel or a rear wheel (hereinafter, referred to as a wheel in common) of the electric bicycle, to rotate the wheel, thereby enabling the running of the electric bicycle. In general, the motor structure is constituted by including a motor, a decelerator unit to reduce a rotary power of the motor, and a power transmission unit to transfer the rotary power output from the decelerator unit to the wheel.

However, the motor structure as such is needed to have the motor, decelerator unit and the power transmission unit, causing an inconvenience in the assembly process of the components while complicating the structure thereof. In addition, the volume is increased, so the spatial efficiency and esthetic quality is degraded.

SUMMARY

Therefore, it is an aspect of the present disclosure to provide a motor structure for an electric bicycle having a reduced volume thereof and capable of transferring a rotary force to the wheel with a simplified structured.

Additional aspects of the disclosure will be set forth in part in the description which follows and, in part, will be obvious from the description, or may be learned by practice of the disclosure.

In accordance with one aspect of the present disclosure, a motor structure of an electric bicycle includes a motor, a first decelerator unit, a second decelerator unit and a motor housing. The motor may be provided with a rotor and a stator to generate a rotary force to drive a wheel of the electric bicycle, the rotor having an accommodation space formed at a center thereof. The first decelerator unit may be disposed in the accommodation space and connected to a rotating shaft that is rotated together with the rotor. The second decelerator unit may be connected to the first decelerator unit and disposed outside the motor. The motor housing may be configured to accommodate the motor and the second decelerator unit.

The first decelerator unit may include a first sun gear, a plurality of first planet gears, a first carrier, and a first ring gear. The first sun gear may be installed on the rotating shaft. The plurality of first planet gears may be disposed around the first sun gear while being engaged with the first sun gear. The first carrier may be connected to a first center shaft of each of the plurality of first planet gears to output a rotary force. The first ring gear may be fixed while being circumscribed on a periphery of the plurality of first planet gears.

The second decelerator unit may include a second sun gear, a plurality of second planet gears, a second carrier, and a second ring gear. The second sun gear may be installed on the first carrier. The plurality of second planet gears may be disposed around the second sun gear while being engaged with the second sun gear. The second carrier may be connected to a second center shaft of each of the plurality of second planet gears. The second ring gear may be provided while being circumscribed on a periphery of the plurality of second planet gears to output a decelerated rotary force.

The second ring gear may be fixed to the motor housing.

The motor housing may be installed on the wheel and configured to be rotated together with the wheel as a driving force generated from the motor is output from the second ring gear.

The second center shaft may have one end rotatably coupled to the motor and the other end connected to the second carrier such that the second planet gear rotate on the second center shaft.

A one-way clutch may be installed at the rotating shaft or the first carrier so as to allow a rotation of one direction.

An end portion of the second carrier may be rotatably supported by the motor housing.

A bearing may be provided between the second carrier and the motor housing.

The motor structure may further include a motor cover installed on the motor housing to close an open side of the motor housing where the motor is accommodated.

The motor structure may further include a fixing unit coupled to the motor and fixed to a frame of the electric bicycle while passing through the motor cover so as to prevent the stator from rotating.

As described above, a decelerator unit to decelerate the rotary force of the motor is disposed inside the rotor, thereby providing a compact structure when compared to the conventional motor structure.

In addition, an output of the motor having a rotary force with a reduced speed is directly transmitted to the motor housing to rotate the motor housing, and since the motor housing is installed on the wheel, the structure of driving the wheel is simplified, thereby improving the assembly efficiency of the motor structure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
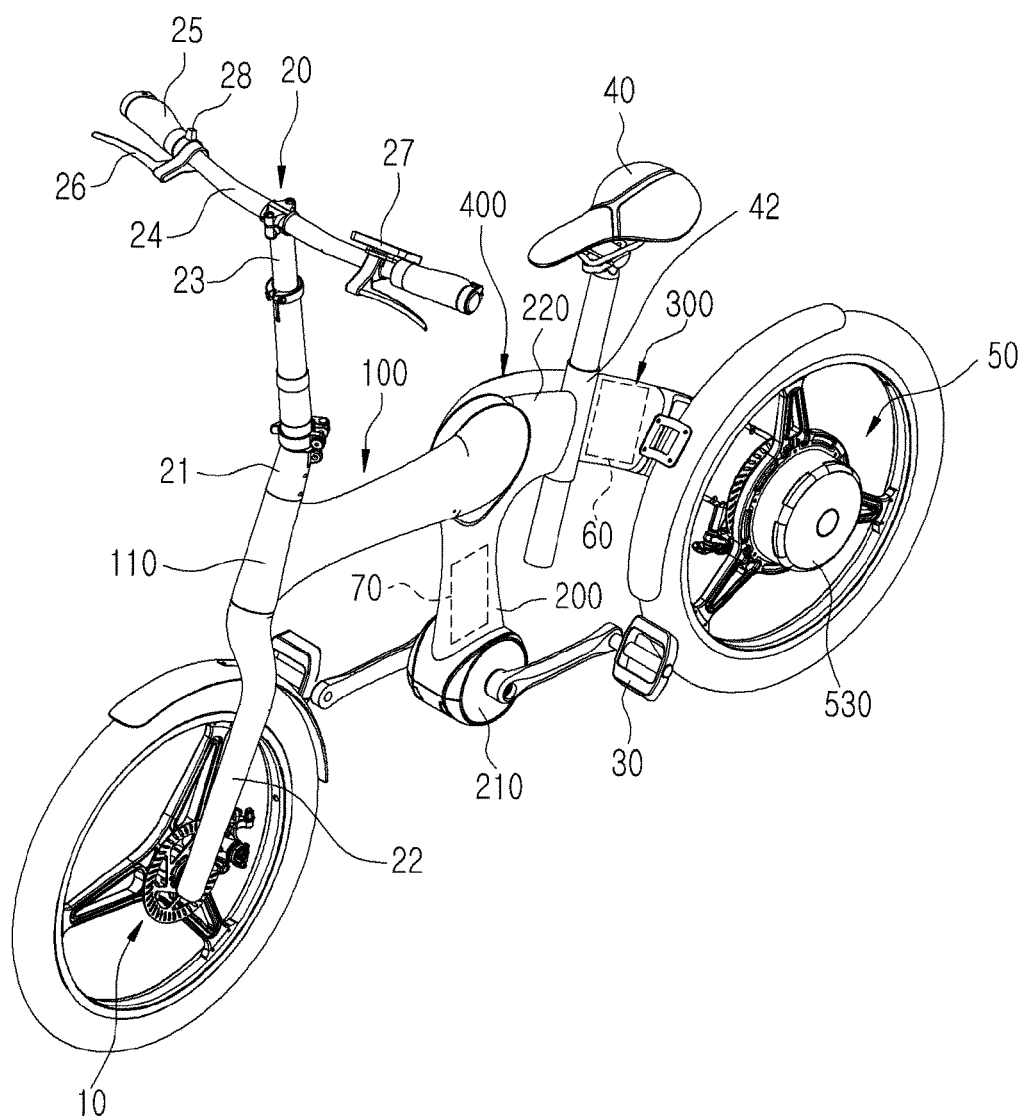
FIG. 1 is a perspective view illustrating an electric bicycle in accordance with one embodiment of the preset disclosure.

Reference will now be made in detail to the embodiments of the present disclosure, examples of which are illustrated in the accompanying drawings, wherein like reference numerals refer to like elements throughout.

The present disclosure is characterized in a motor structure for an electric bicycle. Prior to the description of the characteristics of the present disclosure, an electric bicycle adopted with the present disclosure will be described in brief.

Figure 2:
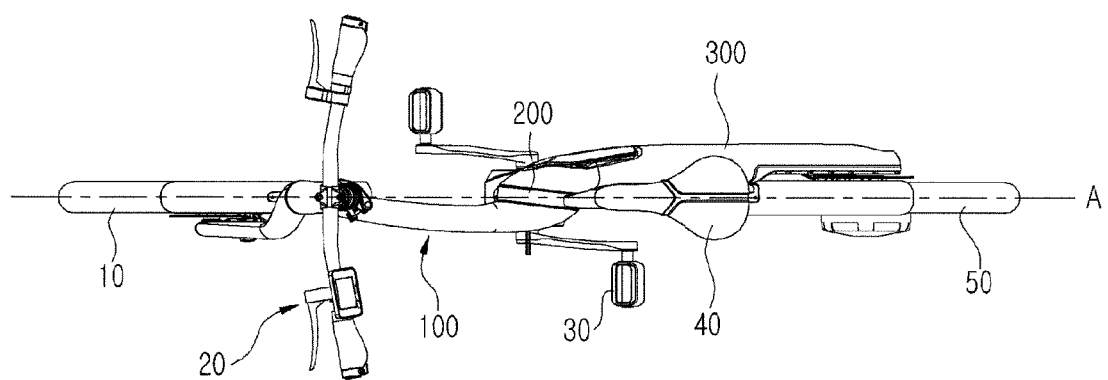
FIG. 2 is a plan view of FIG. 1
Figure 3:
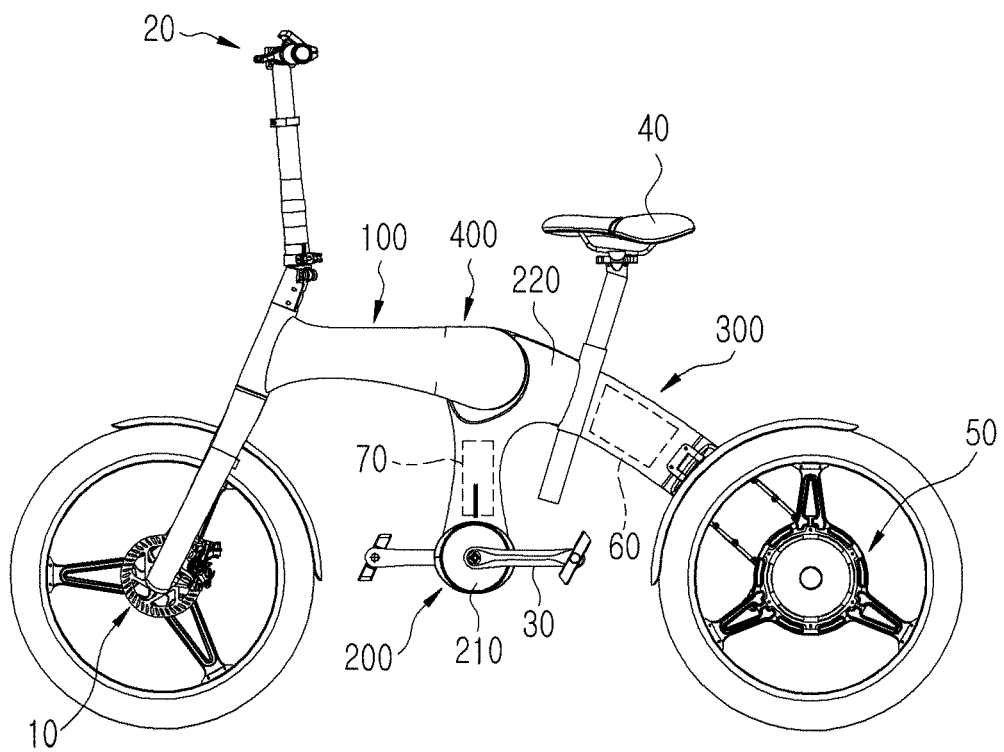
FIG. 3 is a side view of FIG. 1.

FIG. 1 is a perspective view illustrating an electric bicycle in accordance with one embodiment of the preset disclosure, FIG. 2 is a plan view of FIG. 1, and FIG. 3 is a side view of FIG. 1.

Referring to FIGS. 1 to 3, an electric bicycle in accordance with an embodiment of the present disclosure includes a front frame 100 provided with a front wheel 10 and a handle portion 20, a center frame 200 provided with a pedal 30 and a saddle 40, and a rear frame 300 provided with a rear wheel 50. The front frame 100, the center frame 200 and the rear frame 300 are coupled to one another so as to be rotated on a hinge coupling portion 400 of the center frame 200.

The front frame 100 is provided in the form of a bar having an interior space. A handle tube 110 is provided at one end of the front frame 100, and the center frame 200 is rotatably coupled to the other end of the front frame 100. The handle tube 110 is provided in hollowness such that a handle stem 21 is rotatably coupled to the handle tube 110. The handle stem 21 is provided with a front wheel fixing frame 22 at a lower side of the handle tube 110, and provided with a handle fixing frame 23 at an upper side of the handle tube 110. The front wheel fixing frame 22 is provided by partially bending the handle stem 21 from a center to a lateral side such the front wheel 10 is disposed in the same line ('A' of FIG. 2) with the rear wheel 50. The handle fixing frame 23 supports the center of a handle bar 24 that is provided in the form of a bar. Each end portion of the handle bar 24 is provided with a grip 25 and a brake lever 26 for braking the front wheel 10 and the rear wheel 50. A display apparatus 27 is detachably installed at one side of the handle bar 24 to display information of the electric bicycle, such as speed change or battery of the electric bicycle, and a lever 28 is installed at the other side of the handle bar 24 for speed change.

The center frame 200 has an interior space and is provided in the form of a bar. The pedal 30 is provided at one end of the center frame 200, and the front frame 100 and the rear frame 300 are rotatably coupled to the other end of the center frame 200. The one pair of pedals 30 is provided so as to be rotated on a pedal coupling portion 210 provided on the center frame 200. At an inside of the pedal coupling portion 210, a generator (not shown) is provided to convert a rotary power of the pedal 30 into an electric energy, and the electric energy charges a battery 60 electrically connected to the generator. At the interior space of the center frame 200, an engine control unit (ECU) 70 is provided for the electrical connection and control between the generator and other electronic components.

In addition, the center frame 200 may include a saddle frame 220 on which the saddle 40 is installed. The saddle frame 220 is provided at a rear side thereof with a saddle tube 42 on which the saddle 40 is installed. A saddle rod (not shown) is coupled to the saddle tube 42 to adjust the height of the saddle 40.

The rear frame 300 has an interior space and provided in the form of a bar. The rear wheel 50 is rotatably installed at one end of the rear frame 300, and the center frame 200 is rotatably installed at the other end of the rear frame 300.

At the interior space of the rear frame 300, the battery 60 and a battery management system (not shown) are provided that are electrically connected to the ECU 70 provided on the center frame 200. The motor installed on the rear frame 300 is disposed on the rear wheel 50. The motor (not shown) is accommodated in a motor housing 530 that is installed on the rear wheel 50, and configured to rotate the rear wheel 50 by receiving a driving force from the battery 60 according to the control of the ECU 70.

As described above, the front frame 100, the center frame 200 and the rear frame 300 are provided in a foldable structure that enables the front frame 100 and the rear frame 300 are rotated on the center frame 200 by the hinge coupling portion 400.

Hereinafter, a motor structure for an electric bicycle in accordance with the present disclosure will be described in detail. In the drawing, the motor structure is illustrated as being installed on the rear wheel 50 to drive the wheel. However, the present disclosure is not limited thereto, the motor structure may be installed on the front wheel 10. The following description will be made in relation that the motor structure is provided on the rear wheel.

Figure 4:
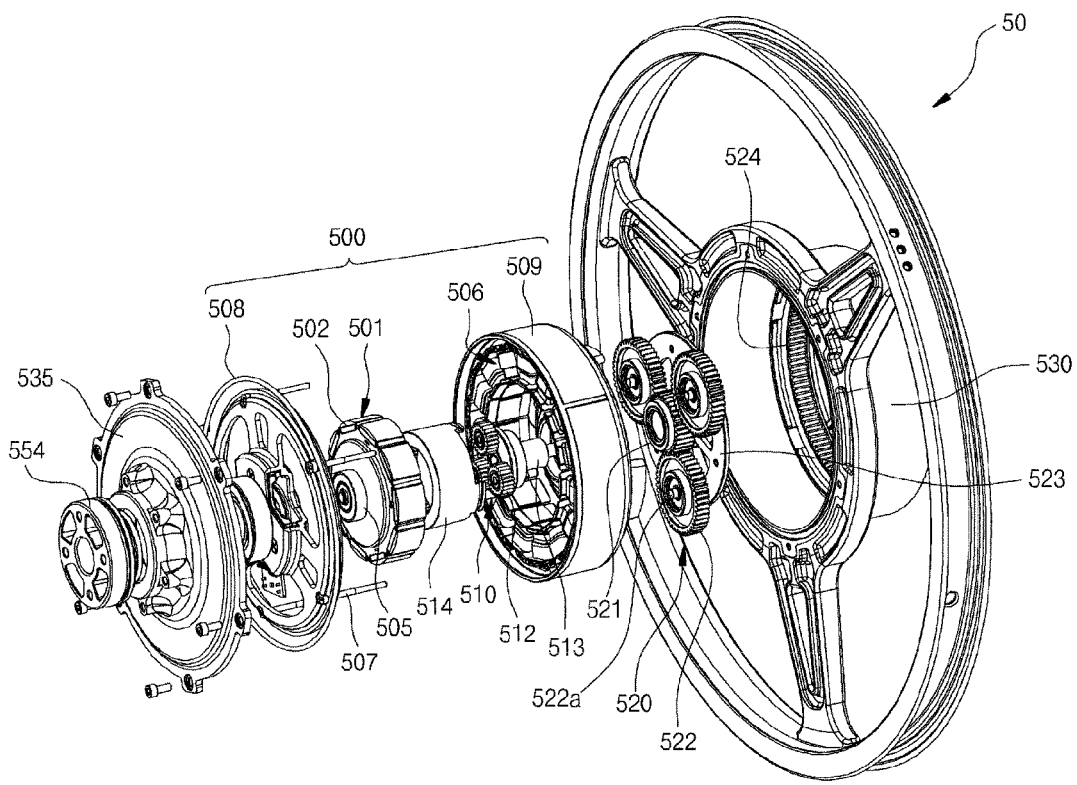
FIG. 4 is an exploded perspective view illustrating a motor structure of the electric bicycle in accordance with the one embodiment of the preset disclosure.
Figure 5:
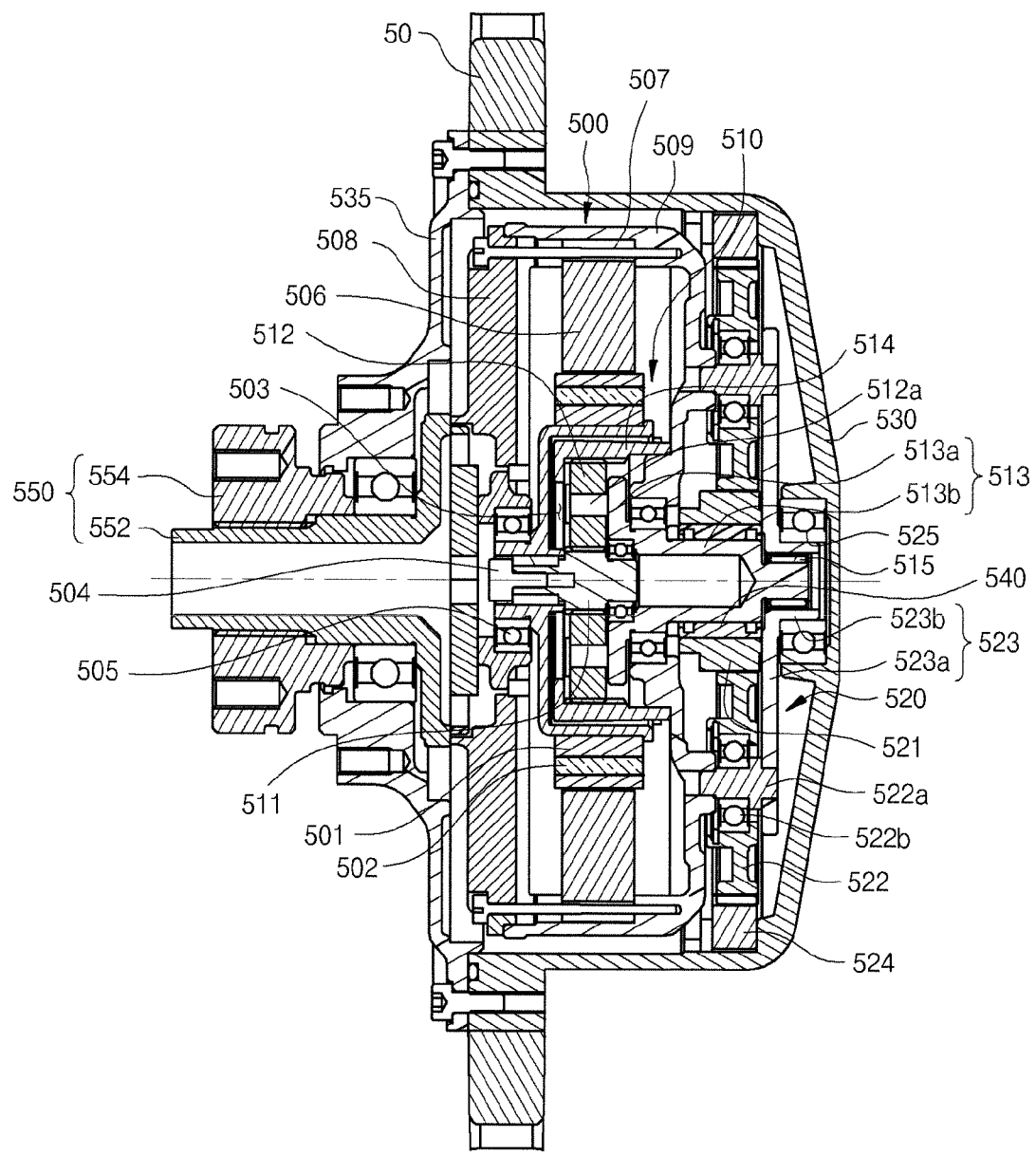
FIG. 5 is an assembled perspective view of FIG. 4.

FIG. 4 is an exploded perspective view illustrating a motor structure of the electric bicycle in accordance with the one embodiment of the preset disclosure, and FIG. 5 is an assembled perspective view of FIG. 4.

Referring to FIGS. 4 and 5, the motor structure includes a motor 500, which is provided with a rotor 501 and a stator 506 to generate a rotary force to drive the wheel 50, and a motor housing 530 to accommodate a first decelerator unit 510 and a second decelerator unit 520 to decelerate the rotary force of the motor 500 as wheel as the motor 500. The motor housing 530 is installed on the wheel 50 so as to be rotated together with the wheel 50 by the driving force generated from the motor 500.

The motor 500 includes a front side housing 508 and a rear side housing 509 that are assembled to each other through a bolt 507, and the rotor 501 and the stator 506 are provided in an interior space formed between the front side housing 508 and the rear side housing 509 assembled to each other.

The rotor 501 is provided in the shape of a ring, and has a plurality of magnets 502 installed thereto while being spaced apart from each other along an outer circumferential surface of the rotor 501. In addition, the rotor 501 is provided at a center thereof with a predetermined accommodation space 503 where a first decelerator unit 510 that is to be described later is disposed. In addition, a rotating shaft 504 rotating together with the rotor 501 is provided at one of two sides of the rotor 501. The rotating shaft 504 serves as an input shaft to transfer a rotary force that is generated from the rotor 501. As illustrated in the drawings, the rotating shaft 504 is provided at a side of the rotor 501 facing the front side housing 508, and a bearing 505 is installed on a rotating shaft 504 so as to be rotatably supported by the front side housing 508. Accordingly, the rotating shaft 504 is easily rotated together with the rotor 501.

The stator 506 is formed to surround the rotor 501 while being spaced apart from the rotor 501 by a predetermined interval. The stator 506 has a coil (not shown) wound thereon, and is installed at an inner circumferential surface of the rear side housing 509. If a power is applied to the coil, an attractive force and a repulsive force act between the magnet 502 and the coil, thereby rotating the rotor 501.

Meanwhile, a fixing unit 550 is installed at a front surface of the front side housing 508 to fix the motor 500 to the rear frame (300 in FIG. 1). The fixing unit 550 is installed on the rear frame 300 while passing through a motor cover 535 that is coupled to close an open side of the motor housing 530. In detail, the fixing unit 550 includes a shaft 552 installed on the front side housing 508, and a mounter 554 bolted to the rear frame 300 while being installed on the shaft 552. If the motor 500 is fixed to the rear frame 300 through the fixing unit 550, the rear side housing 509 coupled to the front side housing 508 and the stator 506 installed on the inner circumferential surface of the rear side housing 509 are fixed while being restricted in rotation. Accordingly, if a power is applied to the coil, only the rotor 501 rotates.

The first decelerator unit 510 serves to decelerate the rotary force of the rotor 501. As described above, the first decelerator unit 510 is disposed in the accommodation space 503 of the rotor 501. In detail, the first decelerator unit 510 includes a first sun gear 511 installed on the rotating shaft 504, a plurality of first planet gears 512 disposed around the first sun gear 511 while being engaged with the first sun gear 511, a first carrier 513 connected to a first center shaft 512a installed at a center of each of the plurality of first planet gears 512 to output the rotary force, and a first ring gear 514 fixed to the rear side housing 509 while being circumscribed on the periphery of the plurality of first planet gears 512.

In the case of the first decelerator unit 510 having a planet gear assembly structure, as the first sun gear 511 coupled to the rotating shaft 504 is rotated by the rotary force of the rotor 501, the rotary force is transferred to the first planet gears 512. The first planet gears 512 revolve by the first ring gear 514 to which the outer circumferential surface of the first planet gears 512 are fixed. Accordingly, the first carrier 513 connected to the first center shaft 512a of each first planet gear 512 is rotated together with the revolution of the first planet gear 512 and thus outputs a decelerated rotary force.

The first carrier 513 is provided with a first flange portion 513a coupled to the first center shaft 512a, and a first shaft portion 513b formed at the center of the first flange portion 513a. In this case, the first shaft portion 513b is disposed collinear with the rotating shaft 504 so as to pass through the rear side housing 509, thereby protruding to the outside the motor 500. In addition, an end portion of the first shaft portion 513b is supported against the motor housing 530 so as to be rotated together with a second carrier 523, which is to be described later, by bearings 515 and 525.

The second decelerator unit 520 includes a second sun gear 521 installed on the first shaft portion 513b, a plurality of second planet gears 522 disposed around the second sun gear 521 while being engaged with the second sun gear 521, a second carrier 523 connected to a second center shaft 522a installed at a center of each of the plurality of second planet gears 522, and a second ring gear 524 circumscribed on the periphery of the plurality of second planet gears 522. The second ring gear 524 is configured to output a rotary power that is decelerated by the second decelerator unit 520.

The second decelerator unit 520 as such has a planet gear assembly structure and is provided between the motor 500 and the motor housing 530. The second center shaft 522a installed at the center of each second planet gear 522 is inserted into a ball bearing 522b so as to be disposed in the center of the second planet gear 522. In addition, one side of the second center shaft 522a is coupled to the rear side housing 509, and the other side of the second center shaft 522a is coupled to the second carrier 523. The second planet gears 522 are rotated by the rotary force of the second sun gear 521.

The second ring gear 524 is coupled to the motor housing 530. That is, as illustrated in the drawings, the second ring gear 524 has a diameter corresponding to an inner diameter of the motor housing 530, is installed on the inner circumferential surface of the motor housing 530.

In the case of the second decelerator unit 520, a rotary force is transferred to the second planet gears 522 through the second sun gear 521 that is rotated together with the first shaft portion 513b, and thus the second planet gears 522 are rotated while being supported by the center shafts 522a of the second planet gears 522. Accordingly, the second ring gear 524 circumscribed on the second planet gears 522 is rotated together with the motor housing 530 through the rotation of the second planet gear 522, and thus a decelerated rotary force is output. Accordingly, the wheel (the rear wheel: 50) coupled to the motor housing 530 is rotated, thereby running the electric bicycle.

Meanwhile, the second carrier 523 is provided with a second flange portion 523a coupled to the second center shaft 522a, and a second shaft portion 523b formed at the center of the second flange portion 523a. In this case, the second shaft portion 523b is disposed collinear with the rotating shaft 504 and the first shaft portion 513b while being supported by the rear side housing 530. As described above, since the bearing 525 is installed on the second shaft portion 523b while being provided between the second shaft portion 523b and the motor housing 530, the second shaft portion 523b is not affected by the rotary force of the motor housing 530 that rotates together with the second ring gear 524.

In addition, the motor structure in accordance with the present disclosure is further provided with a one-way clutch 540 allowing a rotation in one direction. The one-way clutch 540 is provided between the first shaft portion 513b and the second sun gear 521. The one-way clutch 540 is a coupling member that allows a rotation only in one direction. If the first shaft portion 513b rotates in a direction that is allowed by the one-way clutch 540, the rotation of the first shaft portion 513b is transferred to the second sun gear 521 and thus the second sun gear 521 is rotated. The one-way clutch 540 is operated while rotating the wheel 50 through a rotary force generated according to the driving of the electric bicycle. If a rotary force of the wheel 50 is larger than a rotary force of the motor 500, that is, if a larger rotary force is generated beyond a rotary force transferred from the motor 500 at a downhill, the one-way clutch 540 prevents the rotary force of the wheel 50 from being transferred to the motor 500. Although the one-way clutch 540 is illustrated as being installed on the first carrier 513 that outputs a rotary force, which is decelerated by the first decelerator unit 510, the present disclosure is not limited thereto. Alternatively, the one-way clutch 540 may be installed on the rotating shaft 504 serving as an input shaft to transfer a rotary force of the motor 500.

As describe above, the motor structure in accordance with the present disclosure has the first decelerator unit 510 disposed at the inside the rotor 501, so that the motor 500 has a compact size when compared to the conventional motor. In addition, the rotary force is output from the second ring gear 524 fixed to the motor housing 530, and the second ring gear 524 rotates together with the wheel 50 coupled to the motor housing 530. Accordingly, a power transmission unit to transfer a decelerated rotary force to the wheel is not required, and thus a simplified structure of the electric bicycle is provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A motor structure of an electric bicycle, the motor structure comprising:
 a motor provided with a rotor and a stator to generate a rotary force to drive a wheel of the electric bicycle, the rotor having a portion encircling an accommodation space defined therewithin;

a first decelerator unit disposed in the accommodation space to be radially enclosed by the encircling portion of the rotor and connected to a rotating shaft that is rotated together with the rotor;

a second decelerator unit connected to the first decelerator unit and disposed outside the motor; and a motor housing to accommodate the motor and the second decelerator unit, wherein the first decelerator unit comprises:

a first sun gear installed on the rotating shaft;

a plurality of first planet gears disposed around the first sun gear while being engaged with the first sun gear;

a first carrier connected to a first center shaft of each of the plurality of first planet gears to output a rotary force; and a first ring gear fixed while being circumscribed on peripheries of the plurality of first planet gears.

2. The motor structure of claim 1, wherein the second decelerator unit comprises:

a second sun gear installed on the first carrier;

a plurality of second planet gears disposed around the second sun gear while being engaged with the second sun gear;

a second carrier connected to a second center shaft of each of the plurality of second planet gears; and a second ring gear provided while being circumscribed on peripheries of the plurality of second planet gears to output a decelerated rotary force.

3. The motor structure of claim 2, wherein the second ring gear is fixed to the motor housing.

4. The motor structure of claim 3, wherein the motor housing is installed on the wheel and configured to be rotated together with the wheel as a driving force generated from the motor is output from the second ring gear.

5. The motor structure of claim 4, further comprising a motor cover installed on the motor housing to close an open side of the motor housing where the motor is accommodated.

6. The motor structure of claim 5, further comprising a fixing unit coupled to the motor and fixed to a frame of the electric bicycle while passing through the motor cover so as to prevent the stator from rotating.

7. The motor structure of claim 2, wherein the second center shaft has one end rotatably coupled to the motor and another end connected to the second carrier such that the second planet gears rotate on the second center shaft.

8. The motor structure of claim 2, wherein an end portion of the second carrier is rotatably supported by the motor housing.

9. The motor structure of claim 8, wherein a bearing is provided between the second carrier and the motor housing.

10. The motor structure of claim 1, wherein a one-way clutch is installed at the rotating shaft or the first carrier so as to allow a rotation of one direction.

* * * * *